(12) United States Patent
Tanabe

(10) Patent No.: US 8,997,257 B2
(45) Date of Patent: Mar. 31, 2015

(54) INFORMATION PROCESSING APPARATUS AND INFORMATION PROCESSING METHOD

(71) Applicant: Fuji Xerox Co., Ltd., Minato-ku, Tokyo (JP)

(72) Inventor: Shigeru Tanabe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 65 days.

(21) Appl. No.: 13/898,128

(22) Filed: May 20, 2013

(65) Prior Publication Data

US 2014/0096232 A1 Apr. 3, 2014

(30) Foreign Application Priority Data

Oct. 1, 2012 (JP) ................................ 2012-219647

(51) Int. Cl.
*G06F 21/00* (2013.01)
*G06F 21/31* (2013.01)
*G06F 21/84* (2013.01)

(52) U.S. Cl.
CPC ................ *G06F 21/31* (2013.01); *G06F 21/84* (2013.01); *G06F 2221/2137* (2013.01)
USPC .............................................. 726/34; 726/19

(58) Field of Classification Search
CPC ......... G06F 21/30; G06F 21/31; G06F 21/36; G06F 21/82; G06F 21/83
USPC .......................................... 726/17, 2, 34, 19
See application file for complete search history.

(56) References Cited

U.S. PATENT DOCUMENTS

2008/0120716 A1 * 5/2008 Hall et al. ....................... 726/16

FOREIGN PATENT DOCUMENTS

| JP | 05-313773 A | 11/1993 |
| JP | 11-154033 A | 6/1999 |
| JP | 2004-220295 A | 8/2004 |

* cited by examiner

*Primary Examiner* — Edward Zee
(74) *Attorney, Agent, or Firm* — Sughrue Mion, PLLC

(57) ABSTRACT

An information processing apparatus includes a user interface, an authentication unit, a controller, a restriction unit, and an authentication termination unit. The user interface accepts a first operation for setting a parameter from a user. The authentication unit authenticates the user. The controller controls the user interface to display the set parameter. The restriction unit restricts, in a case where a first condition is met after the user has been authenticated by the authentication unit, the user interface from accepting the first operation. The authentication termination unit terminates the authentication of the user in a case where a second condition is met while accepting of the first operation is being restricted by the restriction unit. The controller controls the user interface not to display the set parameter in a case where the second condition is met while accepting of the first operation is being restricted by the restriction unit.

9 Claims, 19 Drawing Sheets

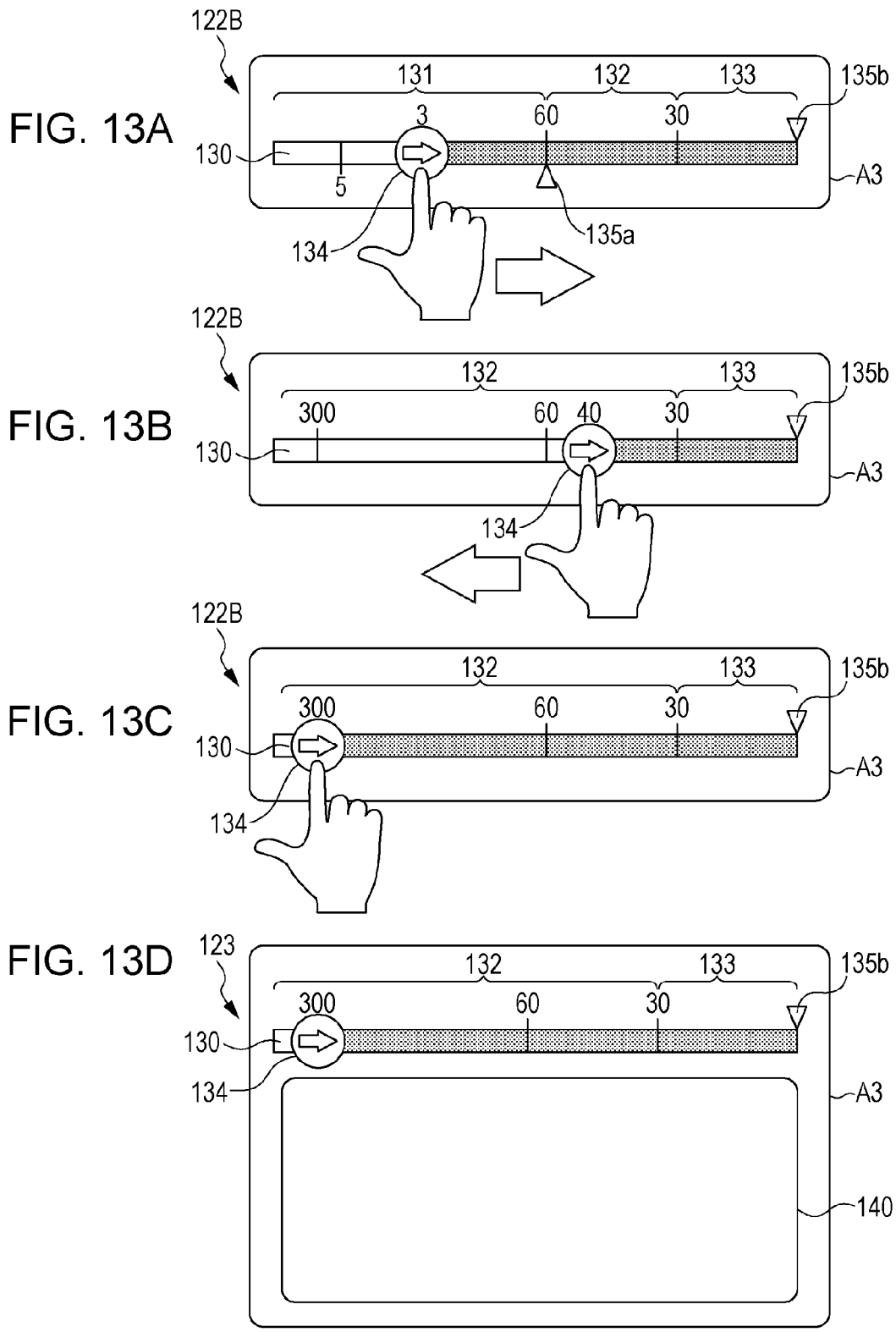

FIG. 21

| USER NAME | TEMPORAL PAUSE MESSAGE | NUMBER OF PARAMETERS CHANGED |
|---|---|---|
| BEING USED BY X | PLEASE INPUT UNLOCK COMMAND OR LOG INTO IMAGE FORMING APPARATUS IN ORDER TO USE IMAGE FORMING APPARATUS. | 1 |
| BEING USED BY X | CURRENT USER POSSIBLY LEFT HERE TO GET PAPERS. PLEASE INPUT UNLOCK COMMAND OR LOG INTO IMAGE FORMING APPARATUS IN ORDER TO USE IMAGE FORMING APPARATUS. | 2 |
| BEING USED BY X | CURRENT USER POSSIBLY LEFT HERE TO GET TONERS. PLEASE INPUT UNLOCK COMMAND OR LOG INTO IMAGE FORMING APPARATUS IN ORDER TO USE IMAGE FORMING APPARATUS. | 0 |
| BEING USED BY X | PLEASE WAIT UNTIL CURRENT USER LOGS OUT IF YOU ARE NOT IN A HURRY. PLEASE INPUT UNLOCK COMMAND OR LOG INTO IMAGE FORMING APPARATUS IN ORDER TO USE IMAGE FORMING APPARATUS. | 100 |
| BEING USED BY X | ORIGINAL DOCUMENT IS LEFT. PLEASE INPUT UNLOCK COMMAND OR LOG INTO IMAGE FORMING APPARATUS IN ORDER TO USE IMAGE FORMING APPARATUS. | 0 |
| BEING USED BY X | CURRENT USER POSSIBLY LEFT HERE TO GET PAPERS. PLEASE WAIT UNTIL CURRENT USER LOGS OUT IF YOU ARE NOT IN A HURRY. PLEASE INPUT UNLOCK COMMAND OR LOG INTO IMAGE FORMING APPARATUS IN ORDER TO USE IMAGE FORMING APPARATUS. | 50 |

INFORMATION PROCESSING APPARATUS AND INFORMATION PROCESSING METHOD

CROSS-REFERENCE TO RELATED APPLICATIONS

This application is based on and claims priority under 35 USC 119 from Japanese Patent Application No. 2012-219647 filed Oct. 1, 2012.

BACKGROUND (i) Technical Field

The present invention relates to information processing apparatuses and information processing methods.

(ii) Related Art

Techniques are available which prevent unauthorized use of an information processing apparatus by preventing a situation in which the user forgets to log out from the information processing apparatus from occurring.

SUMMARY

According to an aspect of the invention, there is provided an information processing apparatus including a user interface, an authentication unit, a controller, a restriction unit, and an authentication termination unit. The user interface accepts a first operation for setting a parameter from a user. The authentication unit authenticates the user. The controller controls the user interface to display the set parameter. The restriction unit restricts, in a case where a first condition is met after the user has been authenticated by the authentication unit, the user interface from accepting the first operation. The authentication termination unit terminates the authentication of the user in a case where a second condition is met while accepting of the first operation is being restricted by the restriction unit. The controller controls the user interface not to display the set parameter in a case where the second condition is met while accepting of the first operation is being restricted by the restriction unit.

BRIEF DESCRIPTION OF THE DRAWINGS

An exemplary embodiment of the present invention will be described in detail based on the following figures, wherein:

FIGS. 13A, 13B, 13C, and 13D each illustrate another example of how the arrow moves in accordance with an operation performed by the user;

FIG. 21 illustrates an example of combinations of the user name, the pause message, and the number of parameters that have been changed;

DETAILED DESCRIPTION

Figure 1:
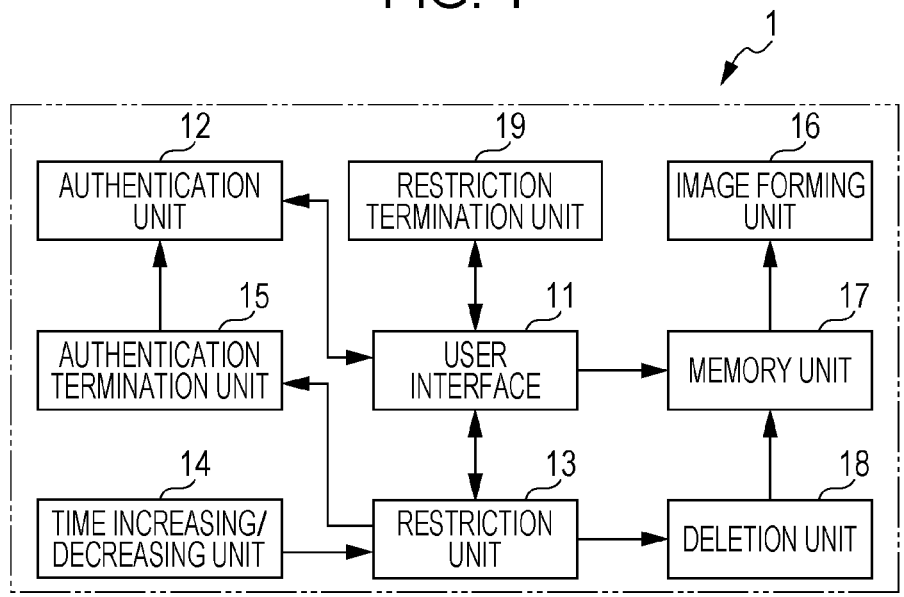
FIG. 1 is a block diagram illustrating the functional configuration of an image forming apparatus.

FIG. 1 is a block diagram illustrating the functional configuration of an image forming apparatus 1 according to an exemplary embodiment of the present invention. The image forming apparatus 1 (an example of an information processing apparatus) is an apparatus that functions as a copier, a printer, a scanner, a facsimile machine, and so forth. The image forming apparatus 1 includes a user interface 11, an authentication unit 12, a restriction unit 13, a time increasing/decreasing unit 14, an authentication termination unit 15, an image forming unit 16, a memory unit 17, a deletion unit 18, and a restriction termination unit 19. The user interface 11 is an interface that accepts data or an instruction input by the user to the image forming apparatus 1. The authentication unit 12 authenticates each user.

The restriction unit 13 restricts the user interface 11 from accepting an operation performed by the user in the case where a first condition is met after the user has been authenticated by the authentication unit 12. The first condition is a condition regarding an operation performed by the user on the user interface 11. Specifically, examples of the first condition include a condition that the user interface 11 has not been operated for a first period and a condition that a specific operation for starting the restriction imposed by the restriction unit 13 is performed by the user. "Restricting the user interface 11 from accepting an operation" corresponds configuring the user interface 11 so that the image forming apparatus 1 does not execute at least some of various functions, such as copying, printing, scanning, and facsimile communication, even if an operation is performed in the same manner as in the normal state (in which acceptance of an operation is not restricted), or configuring the user interface 11 so that the user is unable to perform the same operation as that performed in the normal state. The time increasing/decreasing unit 14 increases or decreases the remaining time before the first condition is met, in accordance with an operation that is accepted by the user interface 11.

In the case where a second condition is met when the restriction is imposed by the restriction unit 13, the authentication termination unit 15 terminates authentication of the user who has been authenticated by the authentication unit 12. The second condition is a condition related to a lapse of time. The second condition may be predetermined by an administrator who administrates the image forming apparatus 1. The image forming unit 16 forms an image on paper (an example of a recording medium). The memory unit 17 stores a parameter that is set as a result of the user operating the user interface 11 and that is to be used in an image forming process. The deletion unit 18 deletes the parameter from the memory unit 17 in the case where the second condition is met. The restriction termination unit 19 terminates the restriction imposed by the restriction unit 13. Specifically, the restriction termination unit 19 terminates the restriction imposed by the restriction unit 13 in the case where the user interface 11 accepts an operation for terminating the restriction.

Figure 2:
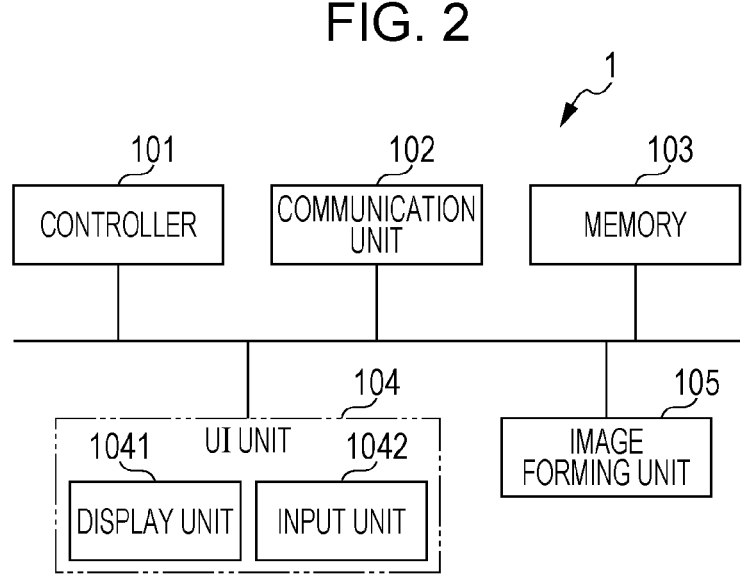
FIG. 2 is a block diagram illustrating the hardware configuration of the image forming apparatus.

FIG. 2 is a block diagram illustrating the hardware configuration of the image forming apparatus 1. The image forming apparatus 1 is a computer including a controller 101, a communication unit 102, a memory 103, a user interface (UI) unit 104, and an image forming unit 105. The controller 101 controls operations performed by the individual components of the image forming apparatus 1. The controller 101 includes a central processing unit (CPU), a read only memory (ROM), and a random access memory (RAM). The communication unit 102 communicates with an external apparatus via a communication line, such as a local area network (LAN) or a telephone line. The memory 103 is a storage device that stores data and programs, and is a hard disk drive (HDD), for example. The memory 103 stores data and programs used by the controller 101. The UI unit 104 includes a display unit 1041 and an input unit 1042. The display unit 1041 includes a display, such as a liquid crystal display or an organic electroluminescence (EL) display, and displays menu screens used to operate the image forming apparatus 1 or various messages. The display unit 1041 includes a touch screen (touch panel) arranged on the display. The input unit 1042 includes various keys used to input data or instructions to the image forming apparatus 1. The user operates the UI unit 104, thereby giving various instructions to the image forming apparatus 1 or making various settings in the image forming apparatus 1. The image forming unit 105 uses, for example, the electrophotographic system or the inkjet system to form an image on paper. Hereinafter, forming an image on paper is referred to as "outputting".

The controller 101, the authentication unit 12, the restriction unit 13, the time increasing/decreasing unit 14, the authentication termination unit 15, the deletion unit 18, and the restriction termination unit 19 included in the image forming apparatus 1 are merely examples. The memory 103 controlled by the controller 101 that is executing a program is an example of the memory unit 17. The UI unit 104 controlled by the controller 101 that is executing the program is an example of the user interface 11. The image forming unit 105 controlled by the controller 101 that is executing the program is an example of the image forming unit 16.

Figure 3:
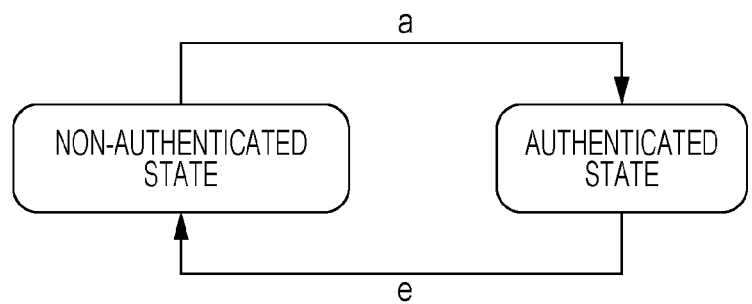
FIG. 3 is a state transition diagram for an image forming apparatus according to a comparative example.

FIG. 3 is a state transition diagram for an image forming apparatus according to a comparative example. This image forming apparatus selectively enters a non-authenticated state or an authenticated state in accordance with whether or not the user has been authenticated. The non-authenticated state indicates that the user has not been authenticated yet, whereas the authenticated state indicates that the user has been authenticated. Various functions of the image forming apparatus, such as copying, printing, scanning, and fax communication, are executed in the authenticated state. In order to use the image forming apparatus, the user causes the image forming apparatus to enter the authenticated state from the non-authenticated state (an arrow "a"). This action is hereinafter referred to as "login". In one example, login is performed by the user inputting a user ID and a password by operating a UI unit. In another example, login may be performed by the user causing the image forming apparatus to read an IC card storing a user ID. The user causes the image forming apparatus to enter the non-authenticated state from the authenticated state (an arrow "e"). This action is hereinafter referred to as "logout". In one example, logout is performed by the user pressing a logout button included in an input unit. Also, in order to prevent an unauthenticated user from using the image forming apparatus, logout is performed if the UI unit has not been operated for a predetermined period. After logout is performed, parameters related to various functions set by the user in the authenticated state are reset to initial values. The user performs login and logout every time before and after they use the image forming apparatus, respectively.

Following circumstances will be considered with regard to the image forming apparatus according to the comparative example. After a user logs in to the image forming apparatus, the user causes the image forming apparatus to pause the operation while using the image forming apparatus. While the operation of the image forming apparatus is paused by the user, a predetermined period has passed and consequently logout is performed. In this case, in order for the user to resume the operation of the image forming apparatus, the user needs to log in to the image forming apparatus again. Also, in the case where the user has set parameters related to various functions before pausing the operation, the user needs to set the parameters again. For example, in the case where the user had been using the copy function and had set multiple parameters used in an image forming process, such as the paper size, the output range, the magnification, on/off of double-sided output, the number of copies to be output, the density, and on/off of color output, the user who has resumed the operation needs to set these parameters again. The image forming apparatus 1 according to an exemplary embodiment of the present invention prevents such inconveniences from occurring through processes to be described below.

Figure 4:
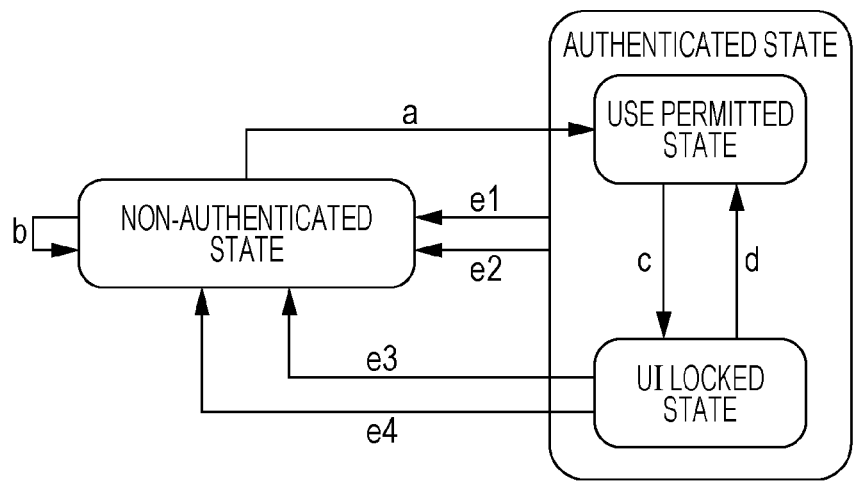
FIG. 4 is a state transition diagram for an image forming apparatus according to an exemplary embodiment of the present invention.

FIG. 4 is a state transition diagram for the image forming apparatus 1 according to the exemplary embodiment of the present invention. The image forming apparatus 1 selectively enters a non-authenticated state or an authenticated state in accordance with whether or not a user has been authenticated. Furthermore, in the authenticated state, the image forming apparatus 1 selectively enters a use permitted state or a UI locked state in accordance with an operation performed by the user. The use permitted state is a state in which the user is permitted to operate the UI unit 104 and to execute various functions, such as copying, printing, scanning, and fax communication. The UI locked state is a state in which the user is restricted from operating the UI unit 104 and from executing the various functions. Once the user logs in to the image forming apparatus 1, the image forming apparatus 1 enters the use permitted state from the non-authenticated state (an arrow "a"). If login of the user is unsuccessful, the non-authenticated state continues (an arrow "b"). In one example, login of the user is unsuccessful when the user inputs a user ID or a password that has not been registered in the image forming apparatus 1. In another example, login of the user is unsuccessful when a user ID read from an IC card has not been registered in the image forming apparatus 1.

The user could cause the image forming apparatus 1 to enter the UI locked state from the use permitted state (an arrow "c"). This action is hereinafter referred to as "locking". The image forming apparatus 1 is locked in the case where the first condition is met. The first condition may be predetermined by an administrator who administrates the image forming apparatus 1. Examples of the first condition include a condition that the UI unit 104 has not been operated for a period (an example of a first period) and a condition that a certain operation is performed on the UI unit 104 by the user. The controller 101 has a use permission timer that shows the remaining time before the image forming apparatus 1 enters the UI locked state from the use permitted state. If the UI unit 104 is operated before the remaining time becomes zero, the controller 101 resets the remaining time of the use permission timer. Note that parameters that the user has set for various functions in the use permitted state are preserved after the image forming apparatus enters the UI locked state.

The user can cause the image forming apparatus 1 to enter the use permitted state from the UI locked state (an arrow "d"). This action is referred to as "unlocking". The image forming apparatus 1 is unlocked, for example, by the user operating the UI unit 104 and inputting a command for unlocking (hereinafter, referred as to an "unlock command") (an example of a third operation). Unlock commands may be registered in advance on a user-by-user basis.

The image forming apparatus 1 makes one user log out from the image forming apparatus 1 in response to four events in which
(1) the user presses a logout button included in the input unit 1042 (an arrow "e1"),
(2) another user attempts to log in to the image forming apparatus 1 (an arrow "e2"),
(3) a predetermined period (an example of a second period) passes after the image forming apparatus 1 has entered the UI locked state (an example of the second condition) (an arrow "e3"), and
(4) an unlock command input by the user is different from an unlock command registered in advance by the user (an arrow "e4").

Among these logout events, the events (1) and (2) occur when the image forming apparatus 1 is in the use permitted state and the UI locked state. The events (3) and (4) occur when the image forming apparatus 1 is in the UI locked state. The controller 101 has a lock timer that shows a period for which the UI locked state is continued. The controller 101 also has a logout timer that shows a period before the image forming apparatus 1 enters the non-authenticated state from the UI locked state. The use permission timer, the lock timer, and the logout timer are started in succession in this order. Specifically, upon the remaining time of the use permission timer becoming zero, the lock timer is started. Upon the remaining time of the lock timer becoming zero, the logout timer is started.

Figure 5:
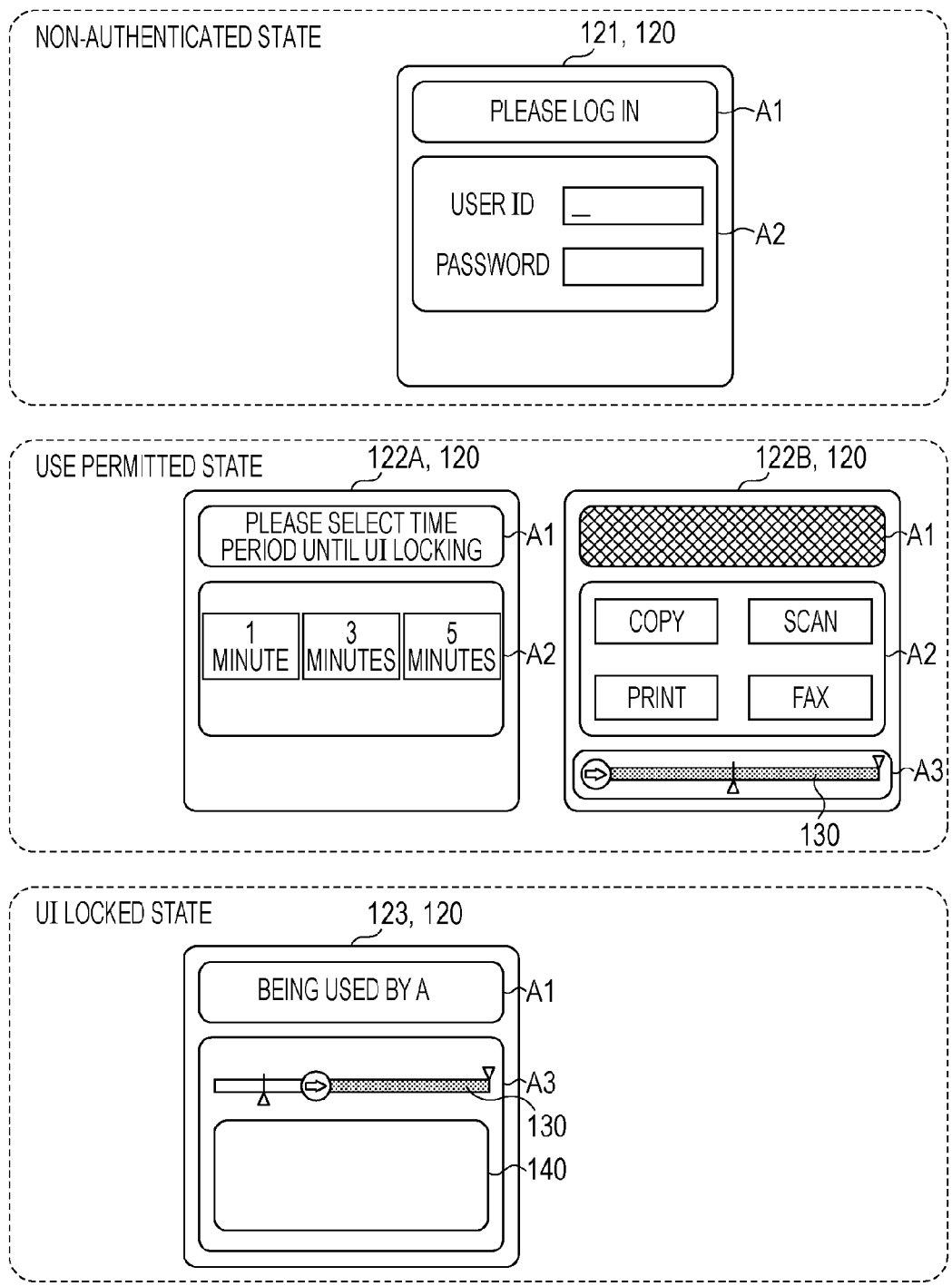
FIG. 5 illustrates examples of a displayed screen image.

FIG. 5 illustrates examples of a screen image 120 displayed on the display unit 1041. The screen image 120 is selectively changed to a non-authenticated-state screen 121, a use-permitted-state screen 122, or a UI-locked-state screen 123 in accordance with the state of the image forming apparatus 1. When the image forming apparatus 1 is in the non-authenticated state, the non-authenticated-state screen 121 is displayed. When the image forming apparatus 1 is in the use permitted state, the use-permitted-state screen 122 is displayed. When the image forming apparatus 1 is in the UI locked state, the UI-locked-state screen 123 is displayed. The non-authenticated-state screen 121, the use-permitted-state screen 122, and the UI-locked-state screen 123 include a message area A1, a service area A2, and a timer area A3. The message area A1 is an area in which a message related to an operation performed on or a process performed by the image forming apparatus 1 is to be displayed. The service area A2 is an area in which a menu screen used to operate the image forming apparatus 1 or a screen used to check the operation performed on the image forming apparatus 1 is to be displayed. The timer area A3 is an area in which the remaining time before the image forming apparatus 1 enters the UI locked state or the non-authenticated state is to be displayed.

The non-authenticated-state screen 121 includes the message area A1 and the service area A2. Referring to FIG. 5, a message that prompts the user to log in is displayed in the message area A1 of the non-authenticated-state screen 121. In this example, a user ID and a password are input to perform login. A sub-screen used to check how a user ID and a password are input is displayed in the service area A2 of the non-authenticated-state screen 121. The user inputs a user ID and a password by operating the input unit 1042 while checking the service area A2.

A use-permitted-state screen 122A is a screen that is displayed to allow the user to set the initial value of the use permission timer. The use-permitted-state screen 122A includes the message area A1 and the service area A2. In FIG. 5, a message that prompts the user to make a setting is displayed in the message area A1 of the use-permitted-state screen 122A. Also, in FIG. 5, options for the initial value are displayed in the service area A2 of the use-permitted-state screen 122A. In the example illustrated in FIG. 5, buttons for "1 minute", "3 minutes", and "5 minutes" are displayed as options for the initial value. The user presses one of the buttons, thereby setting the initial value of the use permission timer. In the case where the initial value of the use permission timer is not set by the user, the image forming apparatus 1 enters the non-authenticated state from the use permitted state.

A use-permitted-state screen 122B is a screen that is displayed to allow the user to perform an operation related to a function to be executed in the image forming apparatus 1. The use-permitted-state screen 122B is displayed after the initial value of the use permission timer is set on the use-permitted-state screen 122A. The use-permitted-state screen 122B includes the message area A1, the service area A2, and the timer area A3. In the service area A2 of the use-permitted-state screen 122B, for example, a sub-screen that allows the user to select a function to be executed or a sub-screen that allows the user to set a parameter related to the function to be executed is displayed. Referring to FIG. 5, in the service area A2 of the use-permitted-state screen 122B, functions "copy", "print", "scan", and "fax" are displayed. In the timer area A3 of the use-permitted-state screen 122B, a time bar 130 (an example of an image) is displayed which has a shape that changes in accordance with the remaining times of the use permission timer, the lock timer, and the logout timer. The time bar 130 shows the remaining time before the image forming apparatus 1 enters the UI locked state from the use permitted state or the remaining time before the image forming apparatus 1 enters the non-authenticated state from the UI locked state. The remaining time is changed if the time bar 130 is operated by the user. Details about the operation performed on the time bar 130 will be described later.

The UI-locked-state screen 123 includes the message area A1 and the timer area A3. Because the UI-locked-state screen 123 does not include the service area A2, the user is restricted from operating the UI unit 104 to execute various functions. Referring to FIG. 5, in the message area A1 of the UI-locked-state screen 123, the user name of the user who has logged in to the image forming apparatus 1 is displayed. In the timer area A3 of the UI-locked-state screen 123, the time bar 130 and an unlock sub-screen 140 are displayed. The unlock sub-screen 140 is a screen where the user performs an unlock operation. The user performs an operation in the unlock sub-screen 140 to input an unlock command.

The following describes details about processes performed by the image forming apparatus 1 when the user performs a login operation, a lock operation, a logout operation, and an unlock operation.

Figure 6:
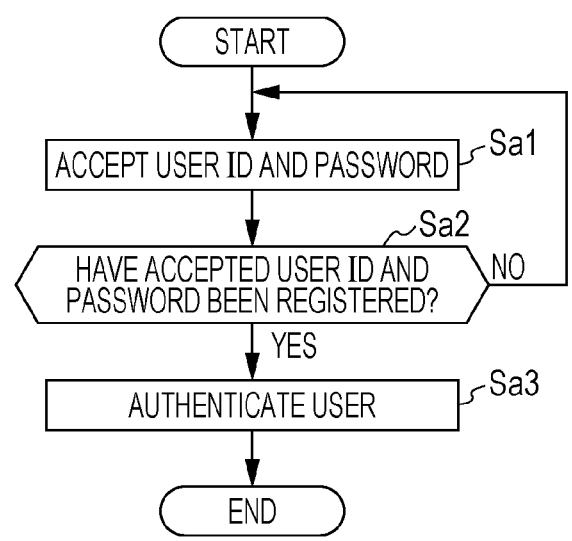
FIG. 6 is a flowchart illustrating a process performed when the user logs in to the image forming apparatus.

FIG. 6 is a flowchart illustrating a process performed by the image forming apparatus 1 when the user performs a login operation. Before the process illustrated in FIG. 6 starts, the image forming apparatus 1 is in the non-authenticated state and thus the non-authenticated-state screen 121 is displayed on the display unit 1041. In step Sa1, the controller 101 accepts input of a user ID and a password. The controller 101 stores the user ID and password input by the user in a RAM.

In step Sa2, the controller 101 determines whether or not the input user ID and password have been registered. User IDs and passwords of users who have the right to use the image forming apparatus 1 are registered in the memory 103 in advance. The controller 101 reads the user ID and password from the RAM, and compares the read user ID with the user IDs stored in the memory 103 and the read password with the passwords stored in the memory 103. If the controller 101 determines that the input user ID and password have been registered (YES in step Sa2), the process proceeds to step Sa3. If the controller 101 determines that the input user ID and password have not been registered (NO in step Sa2), the process returns to step Sa1.

In step Sa3, the controller 101 authenticates the user. The controller 101 stores the input user ID in the RAM again. The controller 101 attaches authentication information, which indicates that a user specified by the user ID has been authenticated, to the user ID before storing the user ID. Thus, the user who uses the user ID with the authentication information is a user who has logged in to the image forming apparatus 1. As a result of the process illustrated in FIG. 6, the image forming apparatus 1 enters the use permitted state from the non-authenticated state. After the image forming apparatus 1 enters the use permitted state, the controller 101 changes the screen image 120 displayed on the display unit 1041 from the non-authenticated-state screen 121 to the use-permitted-state screen 122A. The user performs an operation on the use-permitted-state screen 122A to set the initial value of the use permission timer. After the user sets the initial value, the controller 101 starts the use permission timer, which counts down from the initial value.

FIGS. 7A to 7D illustrate how the timer area A3 changes in the authenticated state as time passes. The time bar 130 includes a use permission time bar portion 131, a lock time bar portion 132, a logout time bar portion 133, an arrow 134, marks 135, and scale marks 136. The use permission time bar portion 131 indicates a time period measured by the use permission timer. The lock time bar portion 132 indicates a time period measured by the lock timer. The logout time bar portion 133 indicates a time period measured by the logout timer. The use permission time bar portion 131, the lock time bar portion 132, and the logout time bar portion 133 are arranged in a line in this order. The arrow 134 indicates a point corresponding to the time specified by the use permission timer, the lock timer, or the logout timer. The arrow 134 moves along the time bar 130 as time passes. The arrow 134 also moves in accordance with an operation performed by the user on the use-permitted-state screen 122B. Above the arrow 134, the current remaining time specified by the use permission timer, the lock timer, or the logout timer is displayed. Each of the marks 135 indicates a time point at which the image forming apparatus 1 enters another state. Specifically, a mark 135a indicates a time point at which the image forming apparatus 1 enters the UI locked state from the use permitted state. A mark 135b indicates a time point at which the image forming apparatus 1 enters the non-authenticated state from the UI locked state. Upon the arrow 134 reaching the position of each mark 135, the image forming apparatus 1 enters the corresponding state. Each of the scale marks 136 is a line indicating a certain time point on the time bar 130.

Figure 7A:
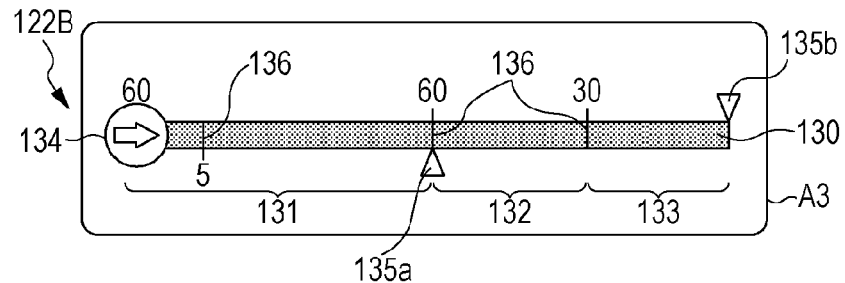
FIGS. 7A, 7B, 7C, and 7D illustrate how a timer area changes in an authenticated state as time passes.
Figure 7B:
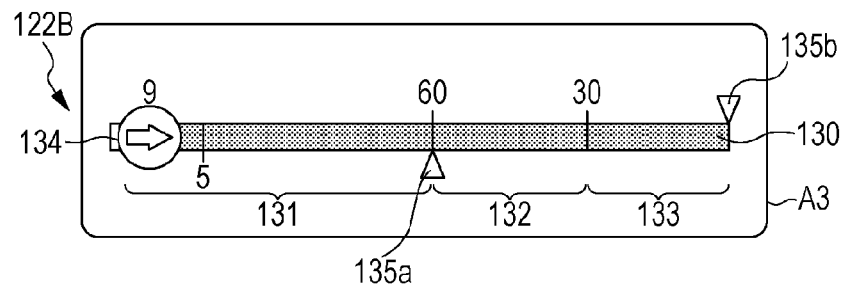
Figure 7C:
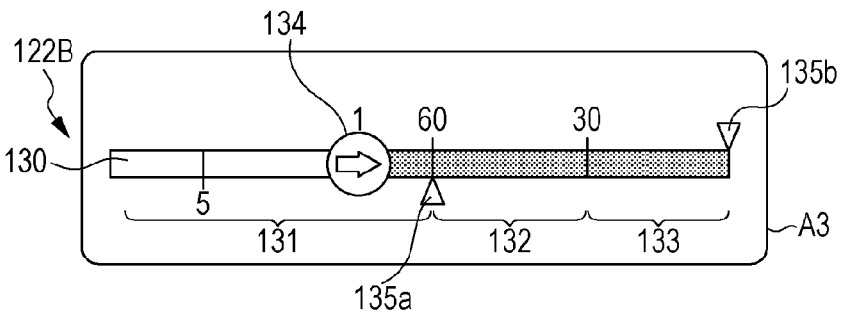

FIGS. 7A to 7C illustrate an example of how the arrow 134 moves in the use permitted state as time passes. In the example illustrated in FIGS. 7A to 7C, the initial value of the use permission timer is 60 seconds. The arrow 134 moves as illustrated in FIGS. 7A, 7B, and 7C as time passes. Upon the arrow 134 reaching the position of the mark 135a, the image forming apparatus 1 enters the UI locked state from the use permitted state. The use permission time bar portion 131 is displayed in such a manner that intervals between adjacent scale marks become larger as the remaining time of the use permission timer decreases. In the example illustrated in FIGS. 7A to 7C, the scale of the use permission time bar portion 131 that indicates the remaining time of the use permission timer from 5 seconds to 0 second (the mark 135a) is larger than that from 60 seconds, which is the initial value, to 5 seconds.

Figure 8A:
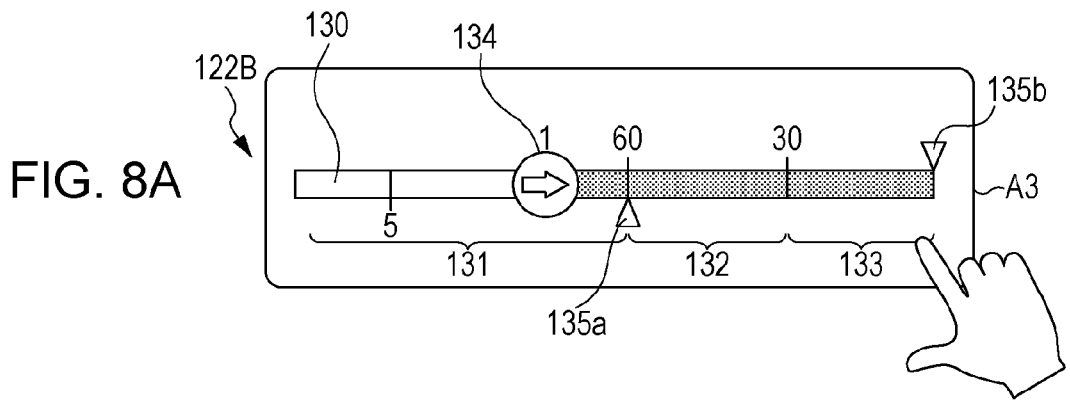
FIGS. 8A and 8B illustrate an example of how the remaining time of a use permission timer is reset.
Figure 8B:
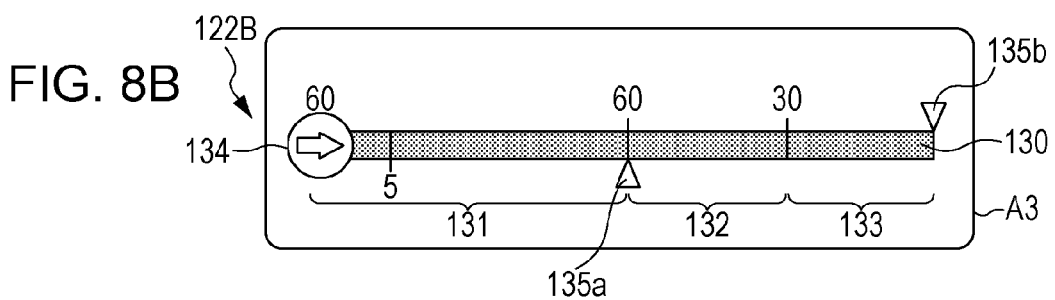

FIGS. 8A and 8B illustrate an example of how the remaining time of the use permission timer is reset. As illustrated in FIG. 8A, if the controller 101 detects that the UI unit 104 is operated before the arrow 134 reaches the position of the mark 135a, the controller 101 resets the remaining time of the use permission timer. After resetting the remaining time of the use permission timer, the controller 101 causes the arrow 134 to be displayed at the initial position as illustrated in FIG. 8B. An area that is touched by the user to reset the remaining time of the use permission timer may be any area within the use-permitted-state screen 122B. The remaining time of the use permission timer is also reset when the controller 101 detects that the input unit 1042 is operated.

Figure 9A:
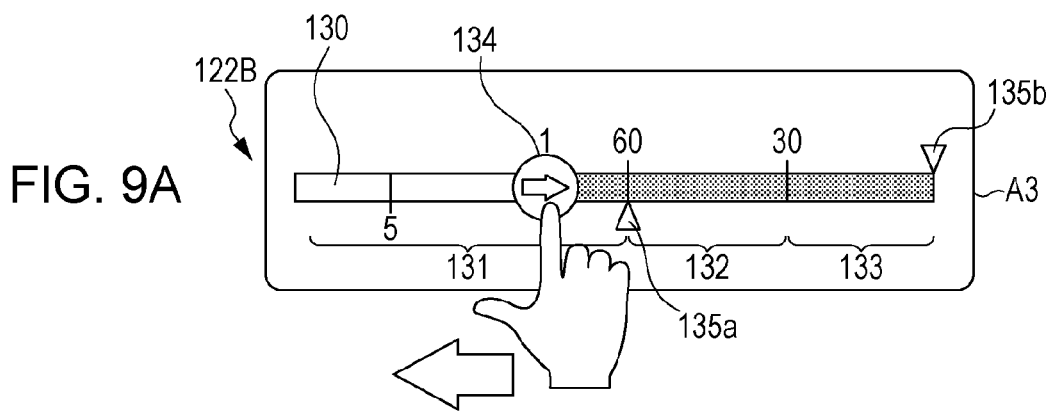
FIGS. 9A and 9B illustrate an example of how an arrow moves in accordance with an operation performed by the user.
Figure 9B:
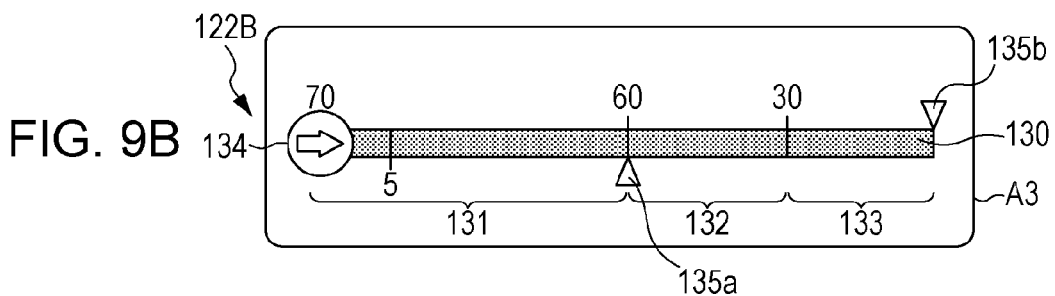

FIGS. 9A and 9B illustrate an example of how the arrow 134 moves in accordance with an operation performed by the user. The user moves their finger along the time bar 130 displayed in the timer area A3 while touching the arrow 134. The arrow 134 may be moved in either direction toward the ends of the time bar 130. Upon detecting that the arrow 134 has been moved, the controller 101 changes the remaining time of the use permission timer. The controller 101 increases or decreases the remaining time of the use permission timer in accordance with the position to which the arrow 134 has been moved. The closer the arrow 134 is moved toward the mark 135a, the smaller the remaining time of the use permission timer becomes. The farther the arrow 134 is moved from the mark 135a, the greater the remaining time of the use permission timer becomes. In this case, the remaining time of the use permission timer may be changed to a value that exceeds the initial value. In the example illustrated in FIGS. 9A and 9B, the user moves the arrow 134 in a direction in which the arrow 134 becomes farther from the mark 135a, and consequently the remaining time of the use permission timer is changed to 70 seconds.

Figure 10:
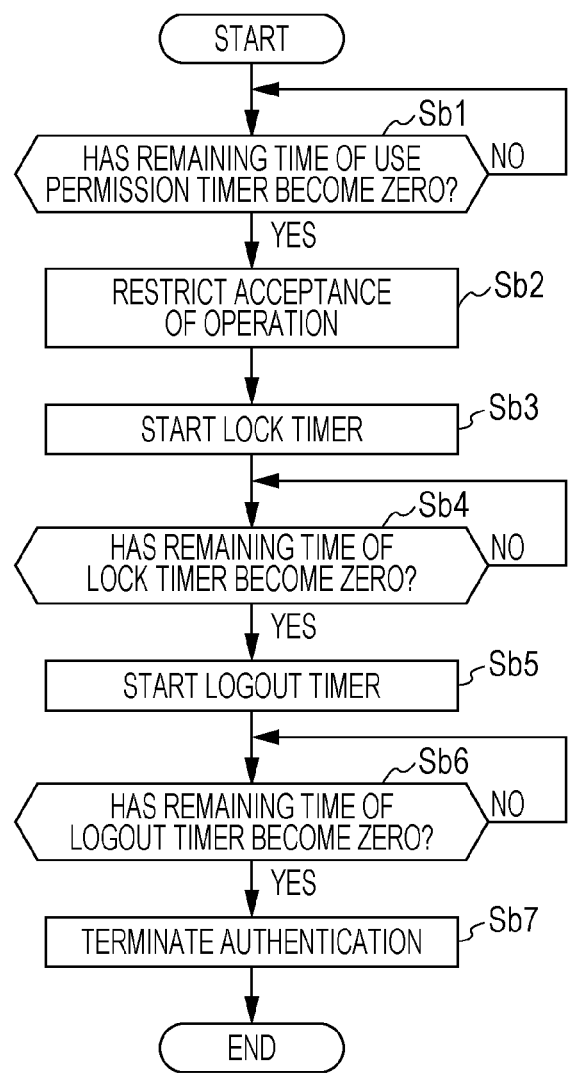
FIG. 10 is a flowchart illustrating a process performed when the user locks and logs out from the image forming apparatus.

FIG. 10 is a flowchart illustrating a process that is performed by the image forming apparatus 1 when the user performs a lock operation and a logout operation. Before the process illustrated in FIG. 10 starts, the image forming apparatus 1 is in the use permitted state, and thus the use-permitted-state screen 122B is displayed on the display unit 1041. In step Sb1, the controller 101 determines whether or not the remaining time of the use permission timer has become zero. The remaining time of the use permission timer becomes zero as a result of a lapse of time, which is illustrated in FIGS. 7A to 7C, and as a result of the user moving the arrow 134. If the controller 101 determines that the remaining time of the use permission timer has become zero (YES in step Sb1), the process proceeds to step Sb2. If the controller 101 determines that the remaining time of the use permission timer has not become zero (NO in step Sb1), the controller 101 waits until the remaining time of the use permission timer becomes zero. In step Sb2, the controller 101 restricts the UI unit 104 from accepting an operation performed by the user thereon. Specifically, the controller 101 changes the screen image 120 displayed on the display unit 1041 from the use-permitted-state screen 122B to the UI-locked-state screen 123, thereby restricting the user from operating the UI unit 104 to execute various functions.

Figure 7D:
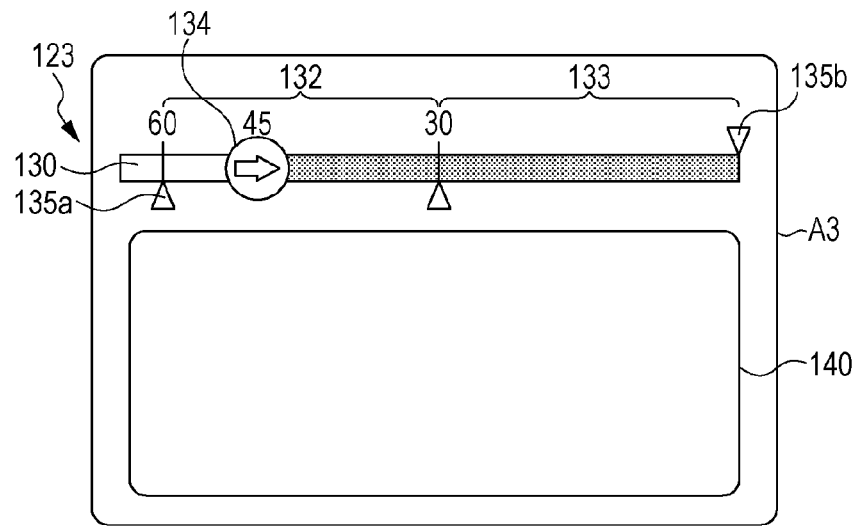

FIGS. 7A to 7D are referred to again. FIG. 7D illustrates the timer area A3 of the UI-locked-state screen 123. After the displayed screen image 120 is changed from the use-permitted-state screen 122B to the UI-locked-state screen 123, the timer area A3 illustrated in FIG. 7C changes to one illustrated in FIG. 7D, in which the unlock sub-screen 140 is displayed in addition to the time bar 130. Also, after the displayed screen image 120 is changed from the use-permitted-state screen 122B to the UI-locked-state screen 123, the use permission time bar portion 131 is hidden and the scale of the time bar 130 is changed.

Figure 11A:
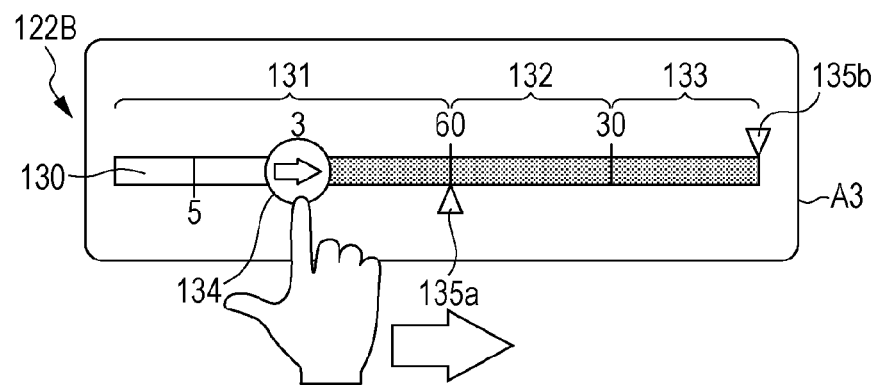
FIGS. 11A, 11B, and 11C illustrate an example in which the user moves the arrow to make the remaining time of the use permission timer zero.
Figure 11B:
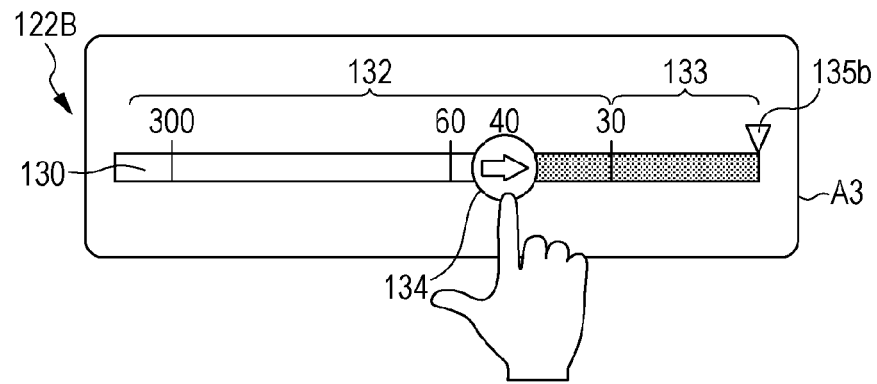
Figure 11C:
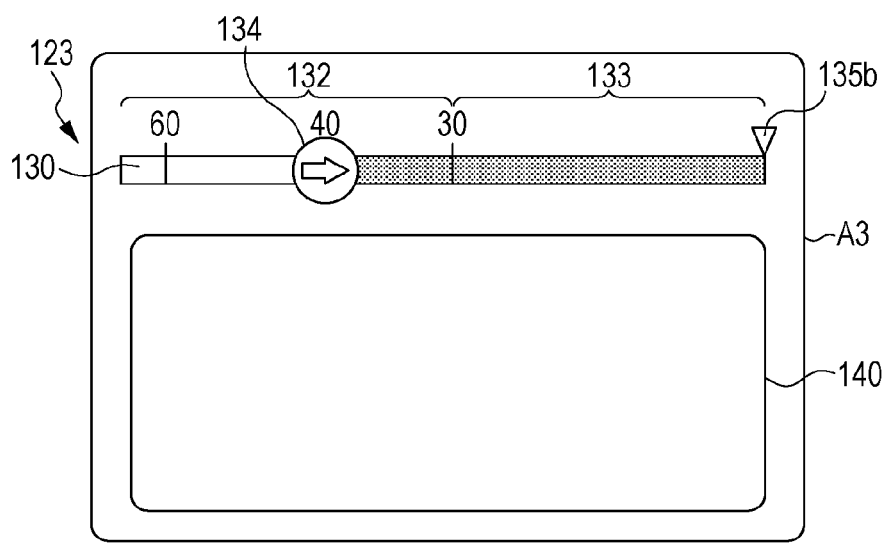

FIGS. 11A to 11C illustrate an example in which the user moves the arrow 134 to make the remaining time of the use permission timer zero. As a result of the user moving the arrow 134 to a position beyond the mark 135a (an example of a specific operation) as illustrated in FIGS. 11A and 11B, the remaining time of the use permission timer becomes zero. In the case where the remaining time of the use permission timer becomes zero as a result of an operation performed by the user, the controller 101 changes the displayed screen image 120 from the use-permitted-state screen 122B to the UI-locked-state screen 123 after detecting that the user's finger has left the arrow 134 as illustrated in FIGS. 11B and 11C. After the displayed screen image 120 is changed to the UI-locked-state screen 123, the arrow 134 no longer moves in accordance with an operation performed by the user.

Figure 12:
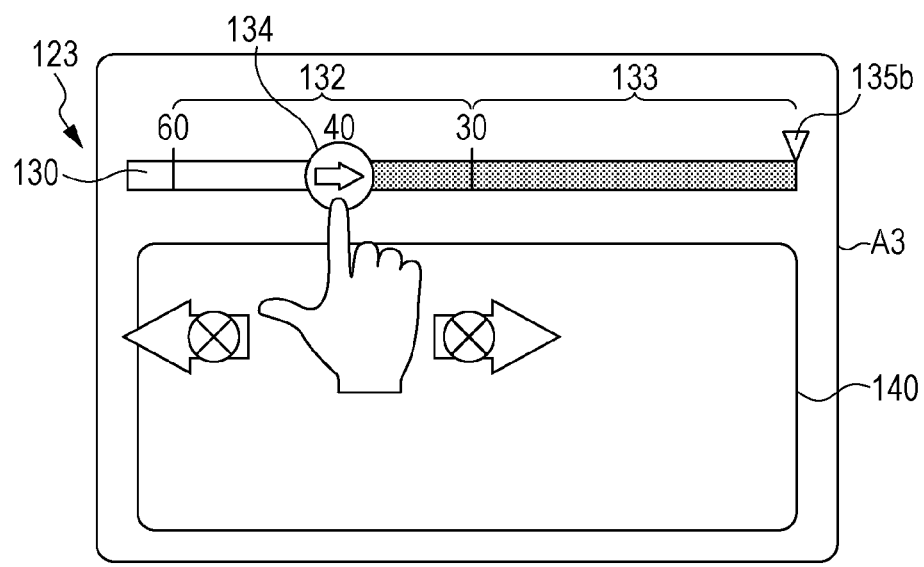
FIG. 12 illustrates an operation performed in a timer area of a UI-locked-state screen.

FIG. 12 illustrates an operation performed in the timer area A3 of the UI-locked-state screen 123. As illustrated in FIG. 12, after the displayed screen image 120 is changed from the use-permitted-state screen 122B to the UI-locked-state screen 123, the UI unit 104 is restricted from accepting an operation for moving the arrow 134.

Referring again to FIG. 10, in step Sb3, the controller 101 starts the lock timer. In step Sb4, the controller 101 determines whether or not the remaining time of the lock timer has become zero. The remaining time of the lock timer becomes zero as a result of a lapse of time and as a result of the user moving the arrow 134. If the controller 101 determines that the remaining time of the lock timer has become zero (YES in step Sb4), the process proceeds to step Sb5. If the controller 101 determines that the remaining time of the lock timer has not become zero (NO in step Sb4), the controller 101 waits until the remaining time of the lock timer becomes zero.

In step Sb5, the controller 101 starts the logout timer. In step Sb6, the controller 101 determines whether or not the remaining time of the logout timer has become zero. The remaining time of the logout timer becomes zero as a result of a lapse of time and as a result of the user moving the arrow 134. If the controller 101 determines that the remaining time of the logout timer has become zero (YES in step Sb6), the process proceeds to step Sb7. If the controller 101 determines that the remaining time of the logout timer has not become zero (NO in step Sb6), the controller 101 waits until the remaining time of the logout timer becomes zero.

FIGS. 7A to 7D are referred to again. In FIG. 7C, upon the arrow 134 reaching the position of the mark 135a, the lock timer is started. In the example illustrated in FIGS. 7A to 7D, the initial value of the lock timer is 60 seconds. Also, upon the arrow 134 reaching the position of the scale mark "30" in FIG. 7D, the remaining time of the lock timer becomes zero. Upon the remaining time of the lock timer becoming zero, the logout timer is started. In the example illustrated in FIGS. 7A to 7D, the initial value of the logout timer is 30 seconds. Upon the arrow 134 reaching the position of the mark 135b in FIG. 7D, the remaining time of the logout timer becomes zero. The remaining time of the lock timer or the logout timer is changed if the user moves the arrow 134.

FIGS. 13A to 13D illustrate another example of how the arrow 134 moves in accordance with an operation performed by the user. In FIGS. 13A to 13D, the user moves the arrow 134, thereby locking the image forming apparatus 1 and changing the initial value of the lock timer from 60 seconds to 300 seconds. In order to change the remaining time of the lock timer, the user first moves the arrow 134 to a position beyond the mark 135a as illustrated in FIGS. 13A and 13B. Upon the arrow 134 crossing the mark 135a as a result of the operation performed by the user, the use permission time bar portion 131 and the mark 135a are hidden and the scale of the time bar 130 is changed as illustrated in FIG. 13B. The user then moves the arrow 134 in a direction in which the arrow 134 becomes farther from the mark 135b in this state. As a result, the remaining time of the lock timer is increased as illustrated in FIG. 13C. In the case where the remaining time of the use permission timer becomes zero as a result of the operation performed by the user, the controller 101 changes the displayed screen image 120 from the use-permitted-state screen 122B to the UI-locked-state screen 123 after detecting that the user's finger has left the arrow 134 as illustrated in FIG. 13D.

Figure 14A:
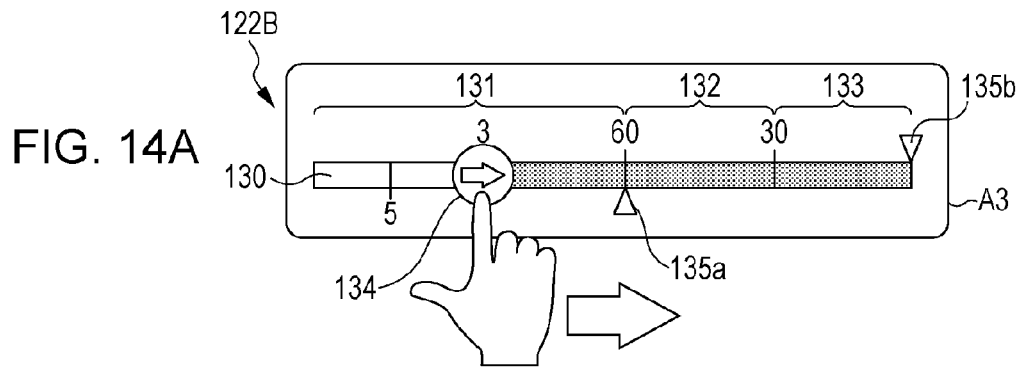
FIGS. 14A and 14B illustrate an example in which the remaining time of a logout timer becomes zero as a result of an operation performed by the user.
Figure 14B:
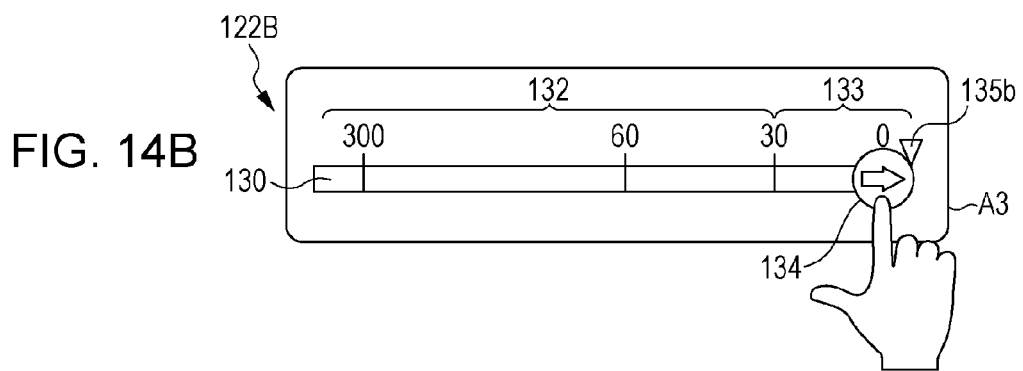

FIGS. 14A and 14B illustrate an example in which the remaining time of the logout timer becomes zero as a result of an operation performed by the user. When the user moves the arrow 134 and consequently the arrow 134 reaches the mark 135b as illustrated in FIGS. 14A and 14B, the remaining time of the logout timer becomes zero. To make the remaining time of the logout timer zero, the user successively performs an operation for making the remaining time of the use permission timer zero, which is illustrated in FIGS. 11A to 11C, and an operation for making the remaining time of the logout timer zero. Note that the operation for making the remaining time of the lock timer zero is performed in a manner similar to that of the operation for making the remaining time of the logout timer zero. To make the remaining time of the lock timer zero, the user moves the arrow 134 until the arrow 134 reaches the scale mark 136 "30".

Referring again to FIG. 10, in step Sb7, the controller 101 terminates authentication of the user. Specifically, the controller 101 deletes the user ID and the authentication information that have been stored in the RAM. As a result of the process illustrated in FIG. 10, the image forming apparatus 1 enters the non-authenticated state from the use permitted state. After the image forming apparatus 1 enters the non-authenticated state, the controller 101 changes the screen image 120 displayed on the display unit 1041 from the UIlocked-state screen 123 to the non-authenticated-state screen 121. Note that in the case where the remaining time of the logout timer becomes zero as a result of the user moving the arrow 134, the controller 101 changes the screen image 120 displayed on the display unit 1041 from the use-permitted-state screen 122B to the non-authenticated-state screen 121 after detecting that the user's finger has left the arrow 134.

Figure 15:
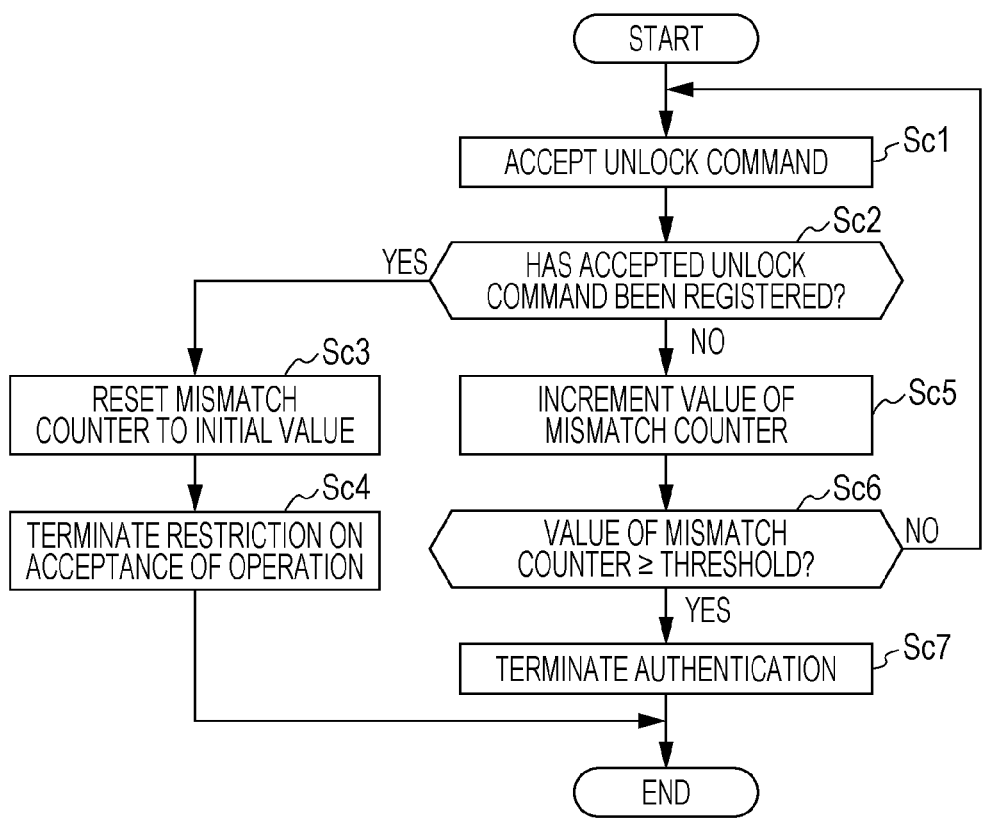
FIG. 15 is a flowchart illustrating a process performed when the user unlock the image forming apparatus.

FIG. 15 is a flowchart illustrating a process that is performed in the image forming apparatus 1 when the user performs an unlock operation. Before the process illustrated in FIG. 15 starts, the image forming apparatus 1 is in the UI locked state and thus the UI-locked-state screen 123 is displayed on the display unit 1041. In step Sc1, the controller 101 accepts input of an unlock command from the user. The controller 101 stores the input unlock command in the RAM.

Figure 16:
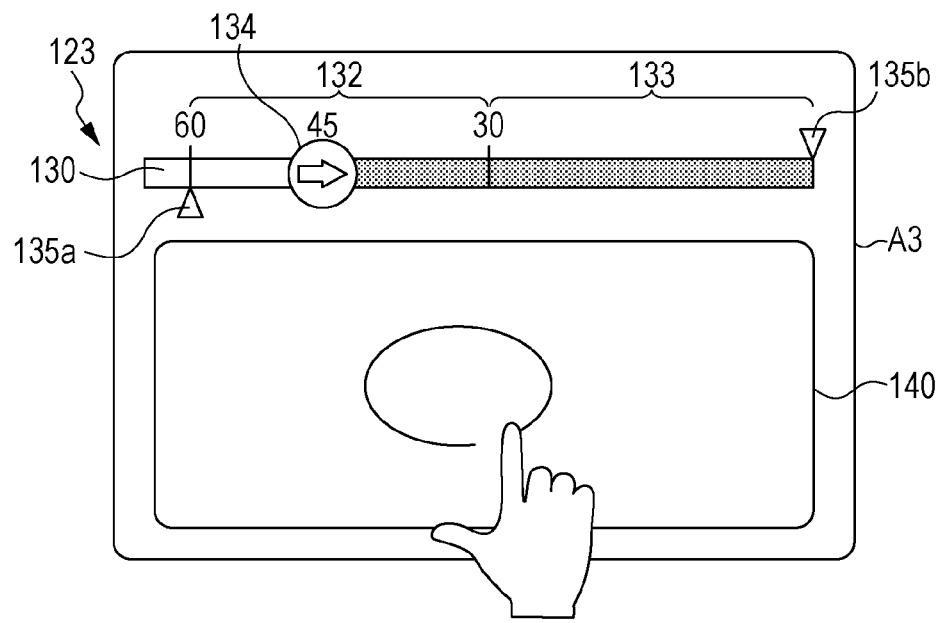
FIG. 16 illustrates an example of how an unlock command is input.

FIG. 16 illustrates an example of how the unlock command is input. An unlock command may correspond to, for example, a character, a figure, or a sign that is registered in advance on a user-by-user basis. As the unlock command, for example, a command that is less troublesome for the user to input than inputting the user ID and the password may be used. The user touches the unlock sub-screen 140 of the UI-locked-state screen 123 to input the unlock command. In the example illustrated in FIG. 16, the user draws a circle on the unlock sub-screen 140 to input the unlock command.

Referring again to FIG. 15, in step Sc2, the controller 101 determines whether or not the input unlock command has been registered. Unlock commands are registered in advance on a user-ID-by-user-ID basis and are stored in the memory 103. The controller 101 reads the user ID and the unlock command from the RAM, and compares the read command with an unlock command associated with the read user ID among the unlock commands stored in the memory 103. If the controller 101 determines that the input unlock command has been registered (YES in step Sc2), the process proceeds to step Sc3. If the controller 101 determines that the input unlock command has not been registered (NO in step Sc2), the process proceeds to step Sc5.

In step Sc3, the controller 101 resets the value of a mismatch counter to the initial value. The mismatch counter is data for counting the number of times it is determined that an unlock command input by the user has not been registered. The mismatch counter is stored in the RAM and its initial value is "0". In step Sc4, the controller 101 terminates the restriction imposed on the UI unit 104, the restriction being not accepting an operation performed by the user. The controller 101 changes the screen image 120 displayed on the display unit 1041 from the UI-locked-state screen 123 to the use-permitted-state screen 122B, thereby terminating the restriction imposed to prevent the user from operating the UI unit 104 and from executing the various functions.

In step Sc5, the controller 101 increments the value of the mismatch counter. In step Sc6, the controller 101 determines whether or not the value of the mismatch counter is greater than or equal to a threshold. The threshold is an upper limit of the number of times the user is allowed to input an incorrect unlock command. The threshold may be predetermined by an administrator who administrates the image forming apparatus 1 and is stored in the memory 103. The controller 101 reads the value of the mismatch counter from the RAM, and compares the value with the threshold. If the controller 101 determines that the value of the mismatch counter is greater than or equal to the threshold (YES in step Sc6), the process proceeds to step Sc7. If the controller 101 determines that the value of the mismatch counter is less than the threshold (No in step Sc6), the process returns to step Sc1. In step Sc7, the controller 101 terminates authentication of the user.

As a result of the registered unlock command being input by the user through the process illustrated in FIG. 15, the image forming apparatus 1 enters the use permitted state. Accordingly, the user is no longer required to perform a login operation again when the user resumes, by unlocking the image forming apparatus 1, the paused operation. Also, setting parameters again is not necessary in the case where the image forming apparatus 1 is unlocked.

The present invention is not limited to the exemplary embodiment described above and various modifications may occur. The following describes some of the modifications. Two or more modifications to be described below may be used in combination.

First Modification

The direction in which the user moves the arrow 134 is not limited to a direction along the time bar 130. For example, in the case where the user changes the initial value of the lock timer, the arrow 134 may be moved in a direction in which the arrow 134 becomes farther from the time bar 130.

Figure 17:
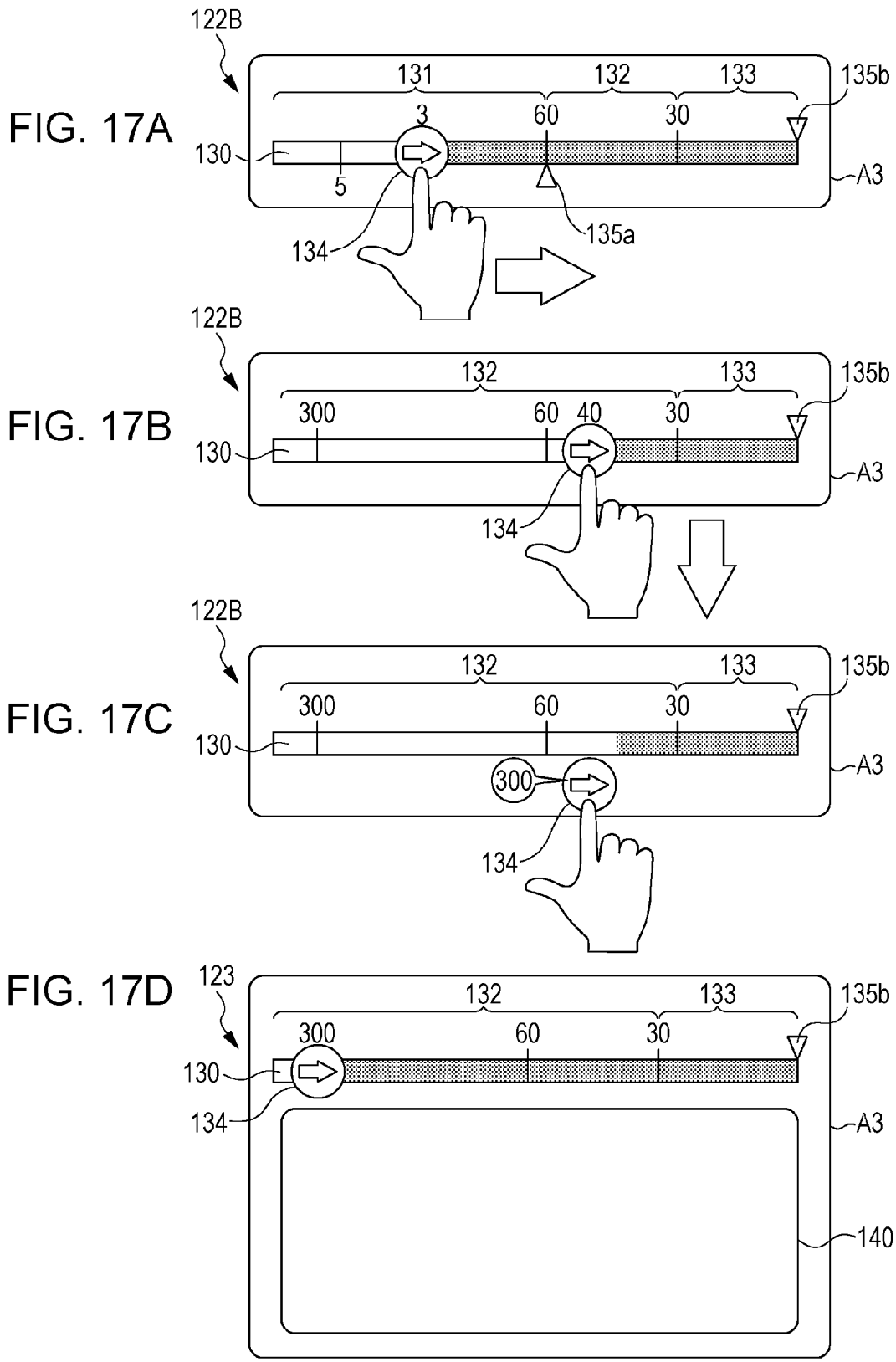
FIGS. 17A, 17B, 17C, and 17D each illustrate how the arrow is operated in accordance with a first modification.

FIGS. 17A to 17D illustrate an operation performed on the arrow 134 in accordance with the first modification. In FIGS. 17A to 17D, the user moves the arrow 134, thereby locking the image forming apparatus 1 and changing the initial value of the lock timer from 60 seconds, which is the original initial value, to 300 seconds. To change the remaining time of the lock timer, the user first moves the arrow 134 to a position beyond the mark 135a as illustrated in FIGS. 17A and 17B. In the first modification, if the user moves the arrow 134 in the direction in which the arrow 134 becomes farther from the time bar 130 in this state, the remaining time of the lock timer increases. The farther the arrow 134 is moved from the time bar 130, the greater the remaining time of the lock timer becomes. In FIGS. 17B and 17C, the user moves the arrow 134 downward from the time bar 130. After detecting that the user's finger has left the arrow 134, the controller 101 changes the displayed screen image 120 from the use-permitted-state screen 122B to the UI-locked-state screen 123 as illustrated in FIG. 17D.

Second Modification

An item displayed in the message area A1 of the UI-locked-state screen 123 is not limited to the user name of the user who has logged in. For example, a message regarding an operation pause (hereinafter, referred to as a pause message) may be displayed in the message area A1 of the UI-locked-state screen 123. The pause message is displayed while the UI unit 104 is being restricted from accepting an operation. In another example, the number of parameters whose settings have been changed by the user from the initial values (hereinafter, referred to as the number of parameters changed) may be displayed in the message area A1 of the UI-locked-state screen 123. In still another example, the user name of the user who has logged in, the pause message, and the number of parameters changed may be displayed in the message area A1 of the UI-locked-state screen 123.

Figure 18:
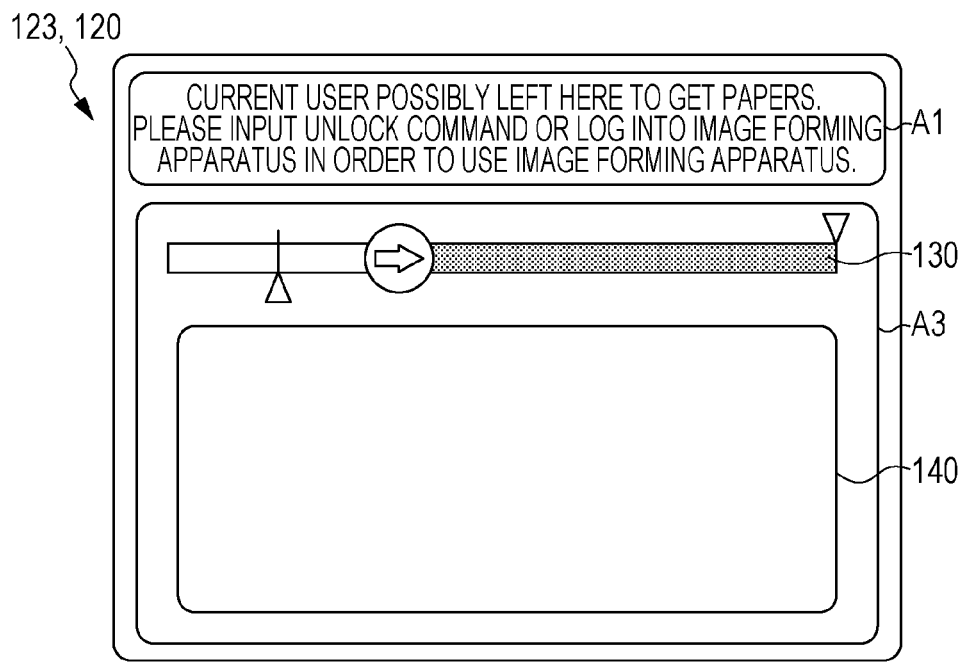
FIG. 18 illustrates an example in which a pause message is displayed in the message area.

FIG. 18 illustrates an example in which the pause message is displayed in the message area A1 of the UI-locked-state screen 123. In this example, the controller 101 displays the pause message in accordance with the operation state of the image forming apparatus 1. For example, suppose that the UI unit 104 is restricted from accepting an operation to be performed thereon when the image forming unit 105, which includes a sensor that detects an out-of-paper state, is detecting the out-of-paper state. In this case, the controller 101 displays a pause message indicating that the user possibly left the image forming apparatus 1 to get paper as illustrated in FIG. 18. In addition to the sensor that detects the out-of-paper state, the image forming unit 105 also includes a sensor that detects an out-of-toner state and a sensor that detects an original document that is left behind. If these sensors detect that the image forming apparatus 1 is run out of toner or an original document is left behind, the controller 101 displays a pause message indicating that the user possibly left the image forming apparatus 1 to get toner or an original document is left behind. The pause message may include a phrase that prompts the user to input the unlock command as illustrated in FIG. 18.

Figure 19:
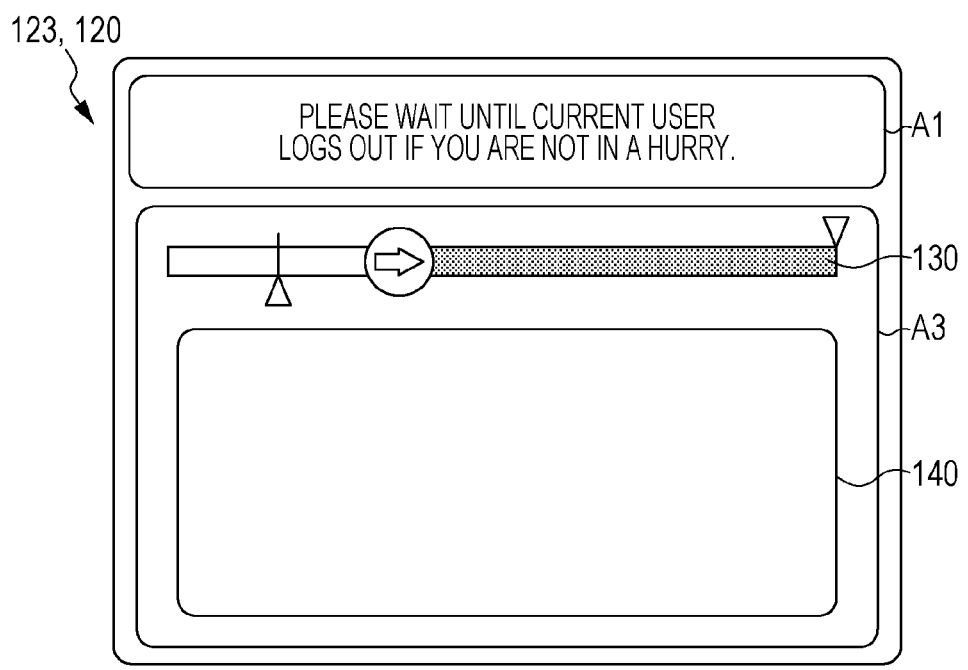
FIG. 19 illustrates another example in which the pause message is displayed in the message area.

FIG. 19 illustrates another example in which the pause message is displayed in the message area A1 of the UI-locked-state screen 123. In this example, the controller 101 displays the pause message in accordance with the number of parameters changed. In the case where the number of parameters changed is greater than or equal to a predetermined value, the controller 101 displays, as the pause message, a message that prompts another user to wait until the remaining time indicated by the time bar 130 becomes zero as illustrated in FIG. 19. Note that the pause message may be displayed in accordance with the operation state of the image forming apparatus 1 and the number of parameters changed.

Figure 20:
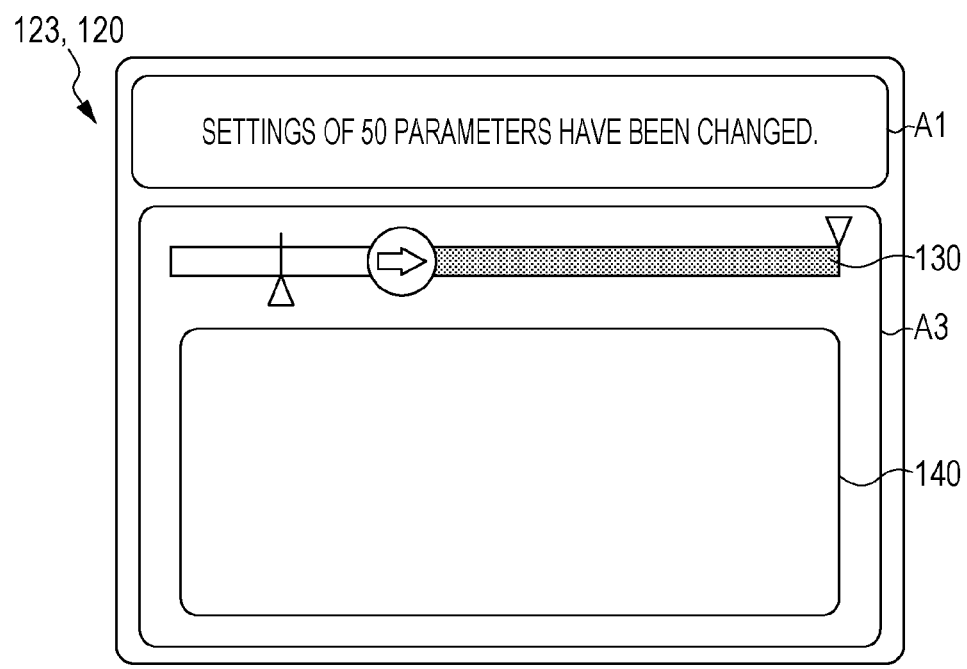
FIG. 20 illustrates an example in which the number of parameters that have been changed is displayed in the message area.

FIG. 20 illustrates an example in which the number of parameters changed is displayed in the message area A1 of the UI-locked-state screen 123. In this example, the user has changed settings of 50 parameters before the operation is paused.

FIG. 21 illustrates an example of combinations used in the case where the user name, the pause message, and the number of parameters changed are displayed in the message area A1 of the UI-locked-state screen 123. In FIG. 21, the pause message is displayed in accordance with the operation state of the image forming apparatus 1 and the number of parameters changed. In the example illustrated in FIG. 21, the pause message contains a phrase that prompts another user to wait until the remaining time indicated by the time bar 130 becomes zero in the case where the number of parameters changed is greater than or equal to 50.

In the case where the pause message or the number of parameters changed is displayed in the message area A1 of the UI-locked-state screen 123 in this manner, a frequency at which other users attempt to log in to the image forming apparatus 1 decreases as compared with the case where these are not displayed.

Third Modification

In the case where the user moves the arrow 134 and locks the image forming apparatus 1, the pause message to be displayed in the message area A1 of the UI-locked-state screen 123 may be selected by the user. In the case where the user moves the arrow 134 and consequently the remaining time of the use permission timer becomes zero, the controller 101 displays a selection screen 150 that allows the user to select a pause message in the displayed screen image 120.

Figure 22A:
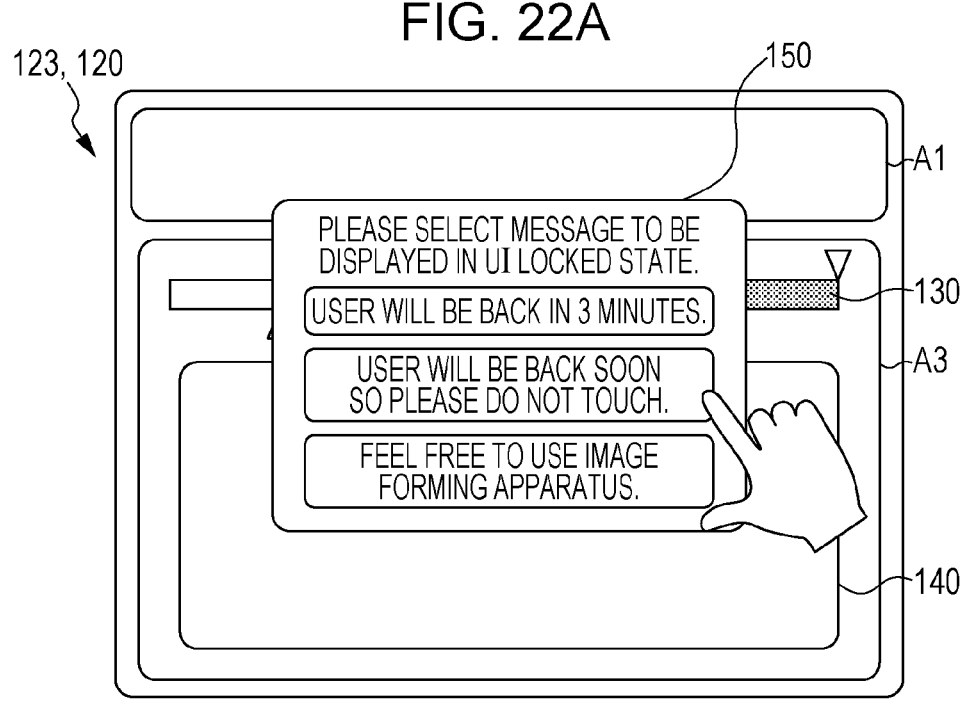
FIGS. 22A and 22B illustrate an example of a selection screen.
Figure 22B:
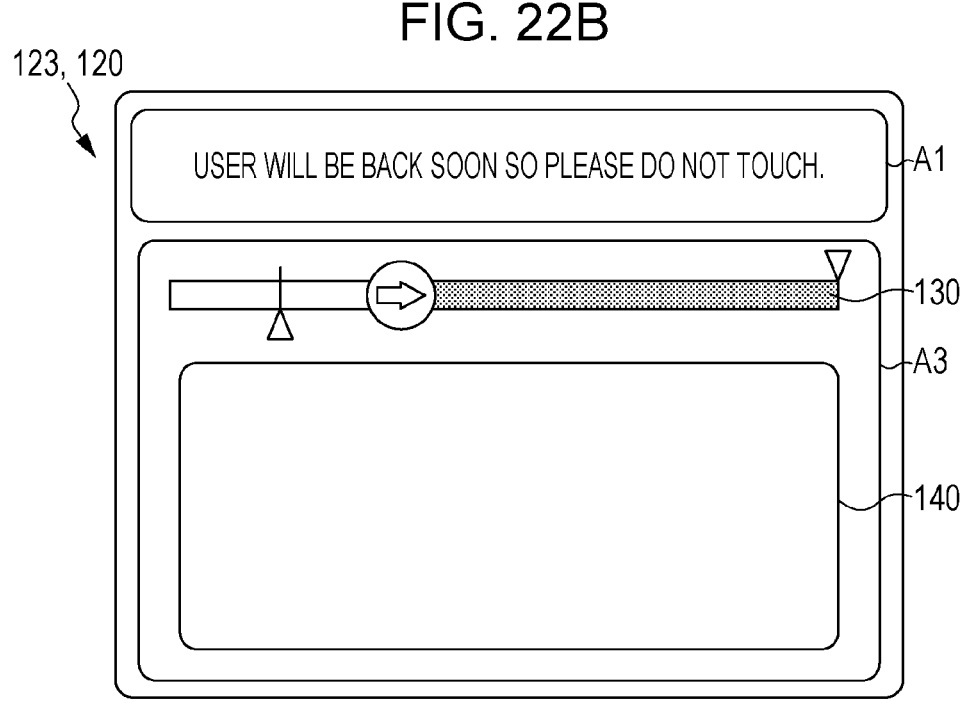

FIG. 22A illustrates an example of the selection screen 150. The selection screen 150 is displayed to be superposed on the UI-locked-state screen 123 when the controller 101 changes the displayed screen image 120 from the use-permitted-state screen 122B to the UI-locked-state screen 123. The selection screen 150 displays options for the pause message. In the example illustrated in FIG. 22A, buttons "user will be back in 3 minutes", "user will be back soon so please do not touch", and "feel free to use image forming apparatus" are displayed as options for the pause message. The user presses one of the buttons to select the pause message. In FIG. 22A, the user selects "user will be back soon so please do not touch" as the pause message. After the pause message is selected, the pause message is displayed in the message area A1 of the UI-locked-state screen 123 (FIG. 22B).

In another example, in the case where the user moves the arrow 134 and locks the image forming apparatus 1, a message input by the user by operating the UI unit 104 may be displayed as the pause message in the message area A1 of the UI-locked-state screen 123. In this case, the controller 101 displays, for example, an input screen that allows the user to input the pause message in the displayed screen image 120.

Fourth Modification

Items displayed in the service area A2 of the use-permitted-state screen 122A are not limited to options described in the exemplary embodiment. For example, a time bar that allows the user to set the initial value of the use permission timer may be displayed in the service area A2 of the use-permitted-state screen 122A. In this case, the user operates the time bar, thereby setting the initial value of the use permission timer in units of seconds, for example.

Fifth Modification

The initial value of the use permission timer is not necessarily set by the user. The initial value of the use permission timer may be predetermined by an administrator who administrates the image forming apparatus 1. In this case, the use-permitted-state screen 122A is not displayed. Instead, after the image forming apparatus 1 enters the use permitted state from the non-authenticated state, the controller 101 changes the screen image 120 displayed on the display unit 1041 from the non-authenticated-state screen 121 to the use-permitted-state screen 122B.

Sixth Modification

The figure displayed in the timer area A3 is not limited to the time bar 130. The figure displayed in the timer area A3 may be any figure whose shape changes in accordance with the remaining times of the use permission timer, the lock timer, and the logout timer and that is operated by the user. For example, a clock that represents the remaining times of the use permission timer, the lock timer, and the logout timer may be displayed in the timer area A3. In this case, the user moves a hand of the clock, thereby changing the remaining time before the image forming apparatus 1 enters the UI locked state from the use permitted state or the remaining time before the image forming apparatus 1 enters the non-authenticated state from the UI locked state. Alternatively, the figure displayed in the timer area A3 may be any figure whose size changes in accordance with the remaining times of the use permission timer, the lock timer, and the logout timer. For example, the figure may be displayed in the timer area A3 in such a manner that the figure becomes smaller as the remaining times of the use permission timer, the lock timer, and the logout timer decrease. Alternatively, the figure displayed in the timer area A3 may be a figure whose shape and size change.

In another example, characters may be displayed in the timer area A3. For example, numbers representing the remaining times of the use permission timer, the lock timer, and the logout timer may be displayed in the timer area A3. In this case, a button for increasing or decreasing the remaining times of the use permission timer, the lock timer, and the logout timer may be displayed in the timer area A3. The user operates this button, thereby changing the remaining time before the image forming apparatus 1 enters the UI locked state from the use permitted state or the remaining time before the image forming apparatus 1 enters the non-authenticated state from the UI locked state.

In still another example, the color of the figure or characters displayed in the timer area A3 may be changed in accordance with the remaining times of the use permission timer, the lock timer, and the logout timer. For example, the color of the figure or characters displayed in the timer area A3 may be changed from a warm color to a cold color as the remaining times of the use permission timer, the lock timer, and the logout timer decrease.

Seventh Modification

Processes related to the present invention are not limited to those illustrated in the flowcharts described above. For example, in FIG. 10, starting the lock timer (step Sb3) and determining whether or not the remaining time of the lock timer has become zero (step Sb4) may be omitted. In this case, upon the remaining time of the use permission timer becoming zero, the logout timer is started. Also in this case, the time bar 130 does not contain the lock time bar portion 132.

Eighth Modification

An event that triggers resetting of the remaining time of the use permission timer is not limited to an operation performed on the UI unit 104. For example, the image forming apparatus 1 may include a sensor that detects presence of the user by using infrared rays or ultrasound waves and the remaining time of the use permission timer may be reset upon the sensor detecting presence of the user.

Ninth Modification

The unlock command is not necessarily input using the figure described in the exemplary embodiment. The unlock command may be input using a character string that is longer than the password used for login. Alternatively, the unlock command may be input by operating the input unit 1042.

Tenth Modification

An information processing apparatus that performs processes related to the present invention is not limited to the image forming apparatus 1. The information processing apparatus may be any apparatus that performs a specific process after the user has been authenticated.

Figure 23:
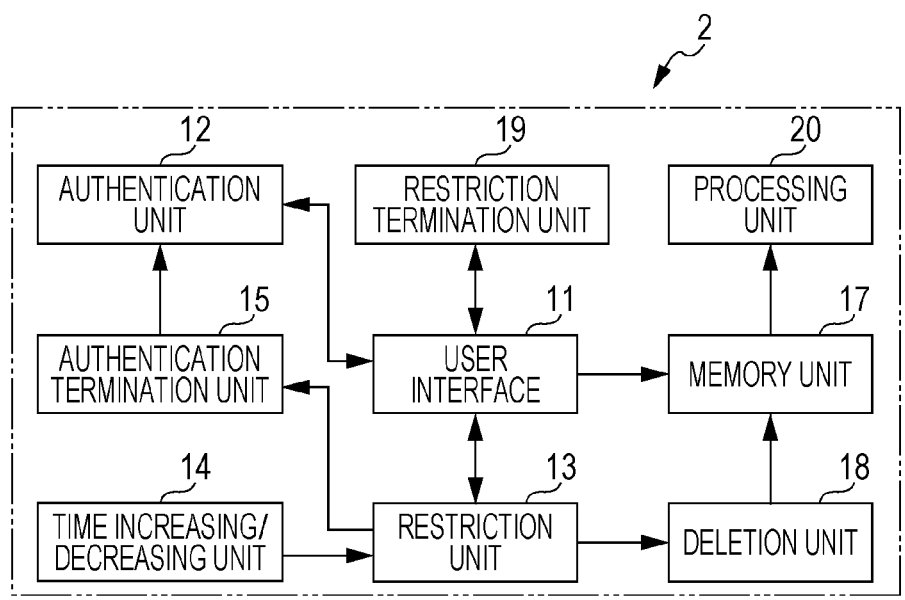
FIG. 23 is a block diagram illustrating the functional configuration of an information processing apparatus according to a tenth modification.

FIG. 23 is a block diagram illustrating the functional configuration of an information processing apparatus 2 according to the tenth modification. Referring to FIG. 23, the information processing apparatus 2 includes a processing unit 20 instead of the image forming unit 16 illustrated in FIG. 1. The processing unit 20 performs a specific process. In this case, the memory unit 17 stores parameters that are set as a result of the user operating the user interface 11 and that are used in the specific process.

Eleventh Modification

A program to be executed by the image forming apparatus 1 in the exemplary embodiment may be provided after being stored on a computer readable recording medium, such as a magnetic recording medium (for example, a magnetic tape or a magnetic disk such as a hard disk drive (HDD) or a flexible disk (FD)), an optical recording medium (for example, an optical disc such as a Compact Disc (CD) or a Digital Versatile Disc (DVD)), a magneto-optical recording medium, or a semiconductor memory (for example, a flash ROM). Also, this program may be downloaded via a network, such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a user interface configured to accept a first operation for setting a parameter from a user;
an authentication unit configured to authenticate the user;
a controller configured to control the user interface to display the set parameter;
a restriction unit configured to restrict, in a case where a first condition is met after the user has been authenticated by the authentication unit, the user interface from accepting the first operation; and
an authentication termination unit configured to terminate the authentication of the user in a case where a second condition is met while accepting of the first operation is being restricted by the restriction unit,
wherein the controller is configured to control the user interface to not display the set parameter in a case where the second condition is met while accepting of the first operation is being restricted by the restriction unit,
wherein the first condition is that any operation has not been accepted for a first period,
wherein the user interface includes a display screen,
wherein the display screen is configured to display an image or character that changes as a remaining time before the first condition is met is increased or decreased,
wherein the user interface is configured to accept a second operation for changing the image or character, and
wherein the information processing apparatus further comprises:
a time increasing/decreasing unit configured to increase or decrease the remaining time in accordance with the second operation accepted by the user interface.

2. The information processing apparatus according to claim 1,
wherein the image or character is displayed in a shape and a size, and
wherein at least one of the shape and the size changes as the remaining time is increased or decreased.

3. An information processing apparatus comprising:
a user interface configured to accept a first operation for setting a parameter from a user;
an authentication unit configured to authenticate the user;
a controller configured to control the user interface to display the set parameter;
a restriction unit configured to restrict, in a case where a first condition is met after the user has been authenticated by the authentication unit, the user interface from accepting the first operation; and
an authentication termination unit configured to terminate the authentication of the user in a case where a second condition is met while accepting of the first operation is being restricted by the restriction unit,
wherein the controller is configured to control the user interface to not display the set parameter in a case where the second condition is met while accepting of the first operation is being restricted by the restriction unit,
wherein the user interface includes a display screen,
wherein the first condition is that a certain operation for starting the restriction imposed by the restriction unit is performed by the user, and
wherein in a case where the first condition is met as a result of the user performing the certain operation, the display screen is configured to display a selection screen that allows the user to select a message to be displayed while accepting of the first operation is being restricted by the restriction unit.

4. The information processing apparatus according to claim 3, wherein the second condition is that a second period has passed since the restriction unit restricted the user interface from accepting the first operation.

5. An information processing apparatus comprising:
a user interface configured to accept a first operation for setting a parameter from a user;
an authentication unit configured to authenticate the user;
a controller configured to control the user interface to display the set parameter;
a restriction unit configured to restrict, in a case where a first condition is met after the user has been authenticated by the authentication unit, the user interface from accepting the first operation; and
an authentication termination unit configured to terminate the authentication of the user in a case where a second condition is met while accepting of the first operation is being restricted by the restriction unit,
wherein the controller is configured to control the user interface to not display the set parameter in a case where the second condition is met while accepting of the first operation is being restricted by the restriction unit,
wherein the user interface is configured to accept, while the restriction unit is restricting the user interface unit from accepting the first operation, a third operation for terminating the restriction before the second condition is met, and
wherein the information processing apparatus further comprises:
a restriction termination unit configured to terminate the restriction in a case where the third operation is accepted by the user interface;
a memory configured to store the parameter that is set through the first operation accepted from the user by the user interface; and
a deletion unit configured to delete the parameter stored in the memory in a case where the second condition is met.

6. The information processing apparatus according to claim 5, wherein the third operation is set on a user-by-user basis.

7. An information processing apparatus comprising:
a user interface that accepts a first operation for setting a parameter from a user;
an authentication unit that authenticates the user;
a controller that controls the user interface to display the set parameter;
a restriction unit that restricts, when any operation has not been accepted for a first period after the user was authenticated by the authentication unit, the user interface from accepting the first operation;
a display that displays, in accordance with the set parameter, different messages while accepting of the first operation is being restricted; and
an authentication termination unit that terminates the authentication of the user when a second period has passed since the restriction unit restricted the user interface from accepting the first operation,
wherein the controller controls the user interface to not display the set parameter when the second period has passed since the restriction unit restricted the user interface from accepting the first operation.

8. An information processing method comprising:
accepting a first operation for setting a parameter from a user via a user interface;
authenticating the user;
controlling the user interface to display the set parameter;
restricting, in a case where a first condition is met after the user has been authenticated, the user interface from accepting the first operation;
terminating the authentication of the user in a case where a second condition is met while accepting of the first operation is being restricted; and
controlling the user interface to not display the set parameter in a case where the second condition is met while accepting of the first operation is being restricted,
wherein the first condition is that any operation has not been accepted for a first period,
wherein the user interface includes a display screen, and
wherein the method further comprises:
displaying, on the display screen, an image or character that changes as a remaining time before the first condition is met is increased or decreased;
accepting, by the use inerface, a second operation changing the image or character; and
increasing or decreasing the remaining time in accordance with the second operation accepted by the user interface.

9. An information processing method comprising:
accepting a first operation for setting a parameter from a user via a user interface;
authenticating the user;
controlling the user interface to display the set parameter;
restricting, when any operation has not been accepted for a first period after the user was authenticated, the user interface from accepting the first operation;
displaying, in accordance with the set parameter, different messages while accepting of the first operation is being restricted;
terminating the authentication of the user when a second period has passed since the restriction unit restricted the user interface from accepting the first operation; and
controlling the user interface to not display the set parameter when the second period has passed since the restriction unit restricted the user interface from accepting the first operation.

* * * * *